United States Patent [19]

Tsuji et al.

[11] Patent Number: 4,853,873
[45] Date of Patent: Aug. 1, 1989

[54] KNOWLEDGE INFORMATION PROCESSING SYSTEM AND METHOD THEREOF

[75] Inventors: Hiroshi Tsuji, Kawasaki; Chizuko Yasunobu, Yokohama; Tetsuya Masuishi, Machida, all of Japan

[73] Assignee: Hitachi, Ltd., Tokyo, Japan

[21] Appl. No.: 59,609

[22] Filed: Jun. 8, 1987

[30] Foreign Application Priority Data

Jun. 11, 1986 [JP] Japan .................. 61-135473

[51] Int. Cl.$^4$ ............................................. G06F 15/24
[52] U.S. Cl. .................................... 364/513; 364/200; 364/900; 364/300
[58] Field of Search ............... 364/513, 478, 900, 300, 364/200, 421

[56] References Cited

U.S. PATENT DOCUMENTS

| | | | |
|---|---|---|---|
| 4,591,983 | 5/1986 | Bennett et al. | 364/478 |
| 4,642,782 | 2/1987 | Kemper et al. | 364/513 |
| 4,648,044 | 3/1987 | Hardy et al. | 364/900 |
| 4,658,370 | 4/1987 | Erman et al. | 364/300 |
| 4,670,848 | 6/1987 | Schramm | 364/513 |
| 4,675,829 | 6/1987 | Clemenson | 364/513 |
| 4,713,775 | 12/1987 | Scott et al. | 364/421 |

FOREIGN PATENT DOCUMENTS 167771 10/1983 Japan .

OTHER PUBLICATIONS

Nikkei Electronics, "Comparison of Tools for Developing Expert Systems ... ," 1985, pp. 153–175.

Primary Examiner—Jerry Smith
Assistant Examiner—P. Gordon
Attorney, Agent, or Firm—Fay, Sharpe, Beall, Fagan, Minnich & McKee

[57] ABSTRACT

An information processing system which has a portion for storing metaknowledge and a portion for utilizing the metaknowledge stored in said storage portion. In newly acquiring knowledge, the utilizing portion utilizes the metaknowledge stored in said storage portion. A knowledge input prompting function that works to utilize the metaknowledge makes reference to metaknowledge in the metaknowledge memory function, looks for knowledge that is lacking, and prompts the input thereof. An input knowledge checking function which also utilizes the metaknowledge makes reference to metaknowledge to look for constraint related to the input knowledge, and evaluates whether it is satisfied or not. These utilization functions make it possible to keep the justification and consistency of knowledge acquired.

15 Claims, 9 Drawing Sheets

FIG. 4

```
IF ANIMAL HAS HAIR
   THEN ANIMAL SPECIES MAMMAL

IF ANIMAL GIVE MILK
   THEN ANIMAL SPECIES MAMMAL

IF ANIMAL HAS FEATHER
   THEN ANIMAL SPECIES BIRD

IF BOTH ANIMAL SPECIES MAMMAL  AND  ANIMAL EAT MEAT
   THEN ANIMAL SPECIES CARNIVORE

IF ANIMAL SPECIES MAMMAL   AND ANIMAL TEETH POINTED TEETH
   AND ANIMAL HAS CLAW AND ANIMAL EYE FORWARD EYES
   THEN ANIMAL SPECIES CARNIVORE

IF ANIMAL SPECIES CARNIVORE AND ANIMAL COLOR TAWNY
   AND ANIMAL PATTERN DARK SPOTS
   THEN ANIMAL SPECIES CHEETAH

IF ANIMAL SPECIES CARNIVORE AND ANIMAL COLOR TAWNY
   AND ANIMAL PATTERN BLACK STRIPE
   THEN ANIMAL SPECIES LION
```

FIG. 5

```
STRUCTURE OF ANIMAL FRAME ~ 31
    SLOT           VALUE                     NUMBER OF VALUE
    SPECIES        ANIMAL CLASSIFICATION TERM    MORE THAN 0
    COLOR          TAWNY/WHITE/BLACK AND WHITE  32  0/1
    PATTERN        DARK SPOTS/BLACK STRIPE/PLAIN    0/1

ANIMAL CLASSIFICATION TERM ~ 33
```

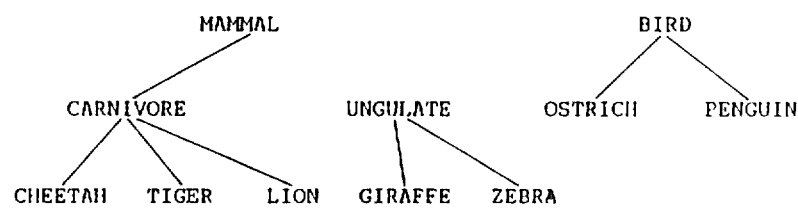

```
             MAMMAL                            BIRD
           /      \                           /     \
       CARNIVORE   UNGULATE            OSTRICH    PENGUIN
       / |  \      |    \
  CHEETAH TIGER LION GIRAFFE ZEBRA

STRUCTURE OF ANIMAL RECOGNITION RULE ~ 35
   IF ANIMAL ?SLOT ?VALUE (AND ANIMAL ?SLOT
      ?VALUE) ~ 36
      THEN ANIMAL SPECIES ?VALUE

CONSTRAINT OF ANIMAL RECOGNITION RULE ~ 38
   AFTER INPUT
      OF RULE        THEN ANIMAL WHEN x OF SPECIES x HAS
                     UPPER CONCEPT
                     BEGINING OF IF PART SHALL HAVE
                     ANIMAL SPECIES UPPER CONCEPT OF x
```

FIG. 7

```
          ┌─51                    ┌─52
IF ANIMAL ?SLOT ?VALUE  > COLOR TAWNY (ret)
   ANIMAL ?SLOT ?VALUE  > NO PATTERN (ret)
                                                    ┌─53
VALUE OF PATTERN SLOT IS DARK SPOTS , BLACK STRIPE OR PLAIN
   ANIMAL PATTERN ?VALUE  > PLAIN (ret)
   ANIMAL ?SLOT ?VALUE  > (ret) ~54
THEN ANIMAL SPECIES ?VALUE  > LION (ret)

NOT COMPLIED WITH CONSTRAINTS " BEGINING OF IF PART SHALL
HAVE ANIMAL SPECIES UPPER CONCEPT OF LION " ~55

CORRECTION OF RULE  > INSERT IF PART 0 ANIMAL SPECIES CARNIVORE

CORRECTION OF RULE  > END
```

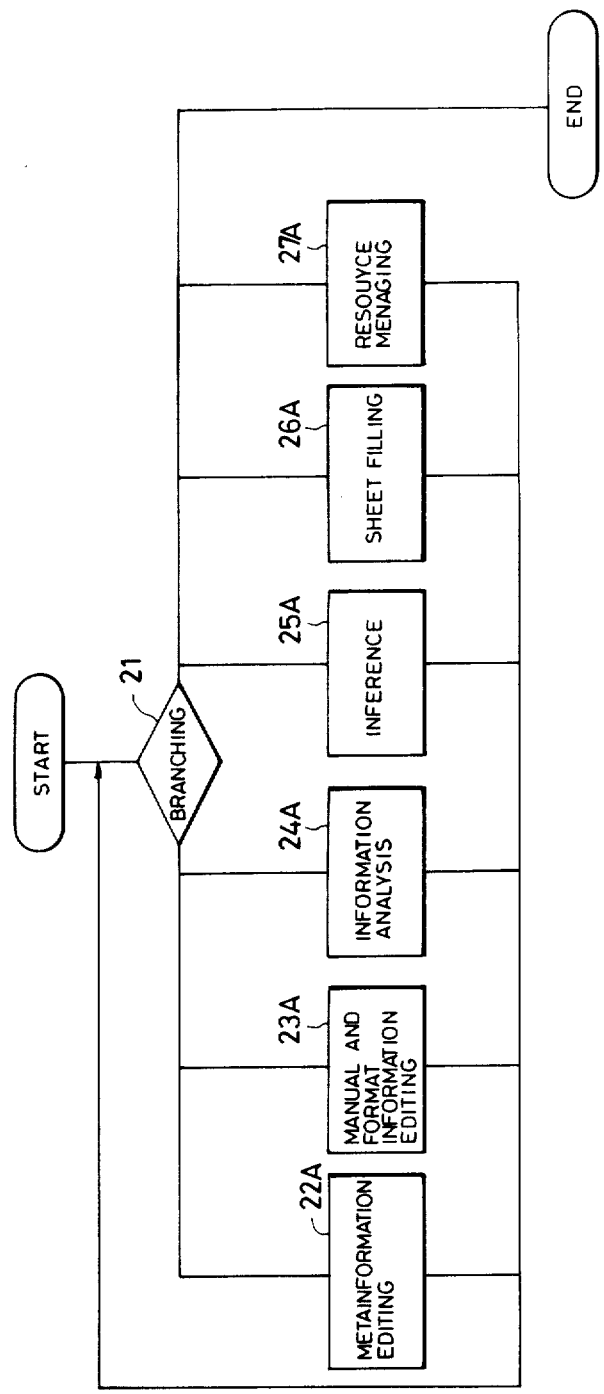

KNOWLEDGE INFORMATION PROCESSING SYSTEM AND METHOD THEREOF

BACKGROUND OF THE INVENTION

1. Field of the Invention

The present invention relates to a knowledge information processing system, and more particularly to a knowledge information processing system which is adapted to efficiently acquiring knowledge and to debugging thereof.

2. Description of the Prior Art

Accompanying the development in the computers and in the peripheral technology thereof, more attention has now been given to storing knowledge to a computer to utilize it. This fact can also be implied from such words as AI (artificial intelligence), knowledge engineering, expert system and like words, that are giving serious impact upon the world in recent years.

Systems that treat information called knowledge, such as expert systems and like systems, have generally been referred to as knowledge information processing systems. It has been said that three large problems, i.e., knowledge representation, knowledge acquisition and knowledge utilization, have to be solved to put these systems into practice.

As for the knowledge acquisition, a variety of knowledge base editors have been described in Nikkei Electronics, "Comparison of Tools for Developing Expert Systems that have been successively placed in the market", Nov. 4, 1985, pp. 153–175.

According to the knowledge acquisition method that pertains to the above conventional technology, no consideration has been given with regard to justification and consistency of the contents of knowledge acquired. Therefore, the user is required to manually confirm the knowledge base to make sure that there exists no error, and is further required to detect a bug.

Japanese Patent Laid-Open No. 167771/1984 discloses a method of acquiring production rule from the experts. According to this method, however, no consideration has been given to acquiring knowledge other than the causality, and the field of application is greatly limited.

SUMMARY OF THE INVENTION

The present invention is accomplished in view of the above-mentioned circumstances, and its object is to provide a knowledge information processing system which eliminates the aforementioned problems inherent in the conventional art, which efficiently acquires knowledge, and which debugs the knowledge thereof.

In order to achieve the above object, the present invention deals with an information processing system which has processing means, memory means and input/output means, wherein said memory means has a portion for storing knowledge about knowledge (meta-knowledge) and a portion that utilizes the meta-knowledge stored in said memory portion, and wherein said processing means has means in which, in acquiring new knowledge, the meta-knowledge stored in said memory portion is utilized by said utilizing portion.

BRIEF DESCRIPTION OF THE DRAWINGS

FIG. 4 is a diagram showing an example of knowledge in a knowledge memory;

FIG. 5 is a diagram showing an example of meta-knowledge in a meta-knowledge memory;

FIG. 7 is a diagram showing an example of interaction relative to a user;

FIG. 9 is a flow chart illustrating the operation of the system.

DETAILED DESCRIPTION OF THE PREFERRED EMBODIMENTS

The present invention, as described above, has a function for storing metaknowledge and a function for utilizing it. The meta-knowledge storage function stores the meta-knowledge that is defined by the user. A knowledge input prompting function that works to utilize the metaknowledge makes reference to meta-knowledge in the meta-knowledge memory function, finds out knowledge that is deficient in a knowledge memory function, and prompts the user to input knowledge thereof. An input knowledge checking function also makes reference to meta-knowledge to look for constraint related to the acquired, and evaluates whether it is satisfied or not. These utilization functions make it possible to keep the justification and consistency of the knowledge acquired.

An embodiment of the invention will now be described in detail in conjunction with the drawings.

Figure 1:
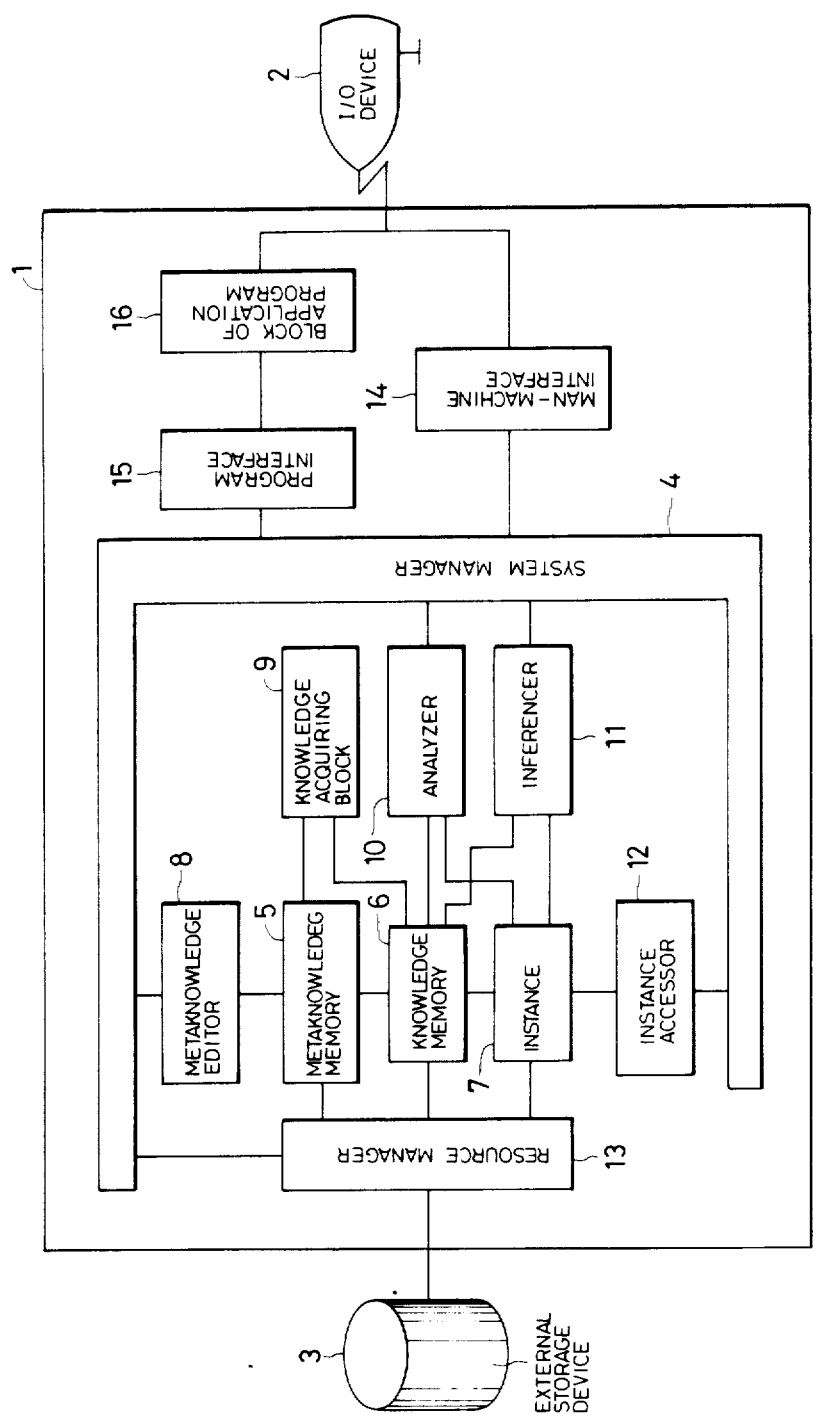
FIG. 1 is a diagram showing the structure of a system according to an embodiment of the present invention.

FIG. 1 is a diagram illustrating the structure of a system according to an embodiment of the present invention, wherein reference numeral 1 denotes a central processing unit, 2 denotes an input/output device, and 3 denotes an external storage device.

The central processing unit 1 comprises three memories, i.e., a meta-knowledge memory 5, a knowledge memory 6 and an instance memory 7, and further comprises six processing devices which include a meta-knowledge editor 8, a knowledge acquiring block 9, an analyzer 10, an inferencer 11, an instance accessor 12 and a resource manager 13, and which make access to the above-mentioned memories. The central processing unit 1 further comprises a system manager 4 that controls these processing devices. One who issues instructions to the system manager 4 is a user of the system (hereinafter simply referred to as "user") of an application program. For this purpose, the central processing unit 1 contains a man-machine interface 14, a program interface 15, and a block of application program 16.

Operation of the system will now be described in conjunction with FIG. 2. The instructions ordered from the man-machine interface 14 and the program interface 15 are branched into six different processings by the system manager 4. Described below is the case where the user directly manipulates the system via the man-machine interface 14.

The meta-knowledge editor 8 executes meta-knowledge editing 22, and meta-knowledge input by the user is stored in the meta-knowledge memory 5.

Meta-knowledge acquisition 23 makes reference to knowledge in the meta-knowledge memory 5, requests the user to input knowledge, and stores in the knowledge memory 6 the knowledge that is inputted by the user. This processing is executed by the knowledge acquiring block 9.

Analysis 24 makes reference to knowledge in the knowledge memory 6 and to knowledge in the instance memory 7, and hands a correlation therebetween over to the user. This processing is executed by the analyzer 10.

Inference 25 is executed by the inferencer 11. This processing is to execute the inference by making reference to knowledge in the knowledge memory 6 and to knowledge in the instance memory 7, and whereby knowledge in the instance memory 7 is updated.

Instance access 26 is executed by the instance accessor 12. This processing is to update knowledge in the instance memory 7.

Resource managing 27 is executed by the resource manager 13 in order to load and unload knowledge treated in this system between the main memory and the external storage device 3.

Operation of knowledge acquisition 23 will now be described in detail.

Figure 3:
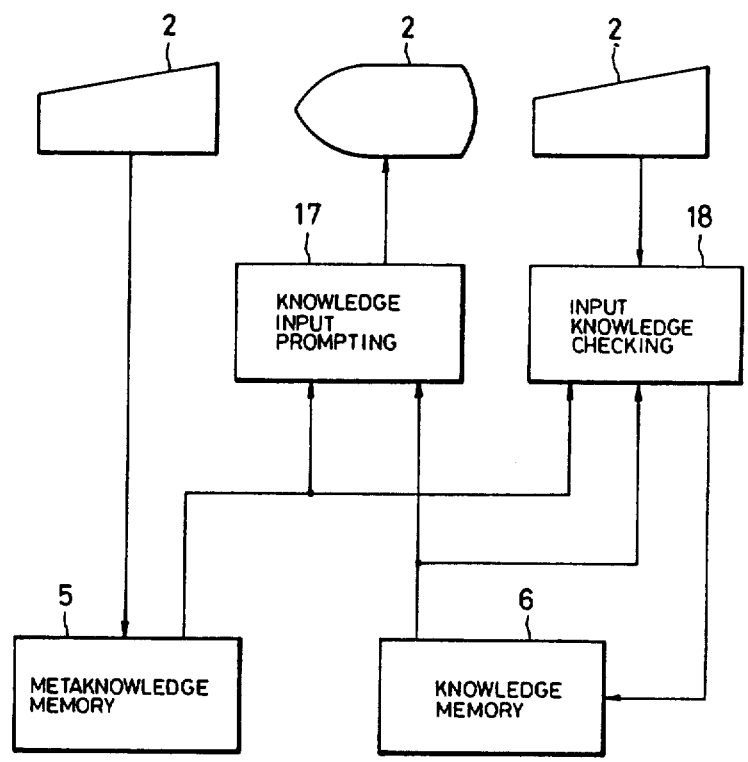
FIG. 3 is a diagram illustrating the structure of a major portion of a knowledge acquiring block.

FIG. 3 illustrates major portions of the apparatus, wherein a knowledge input prompting unit 17 and an input knowledge checking unit 18 are provided in the knowledge acquiring block 9.

There are a variety of meta-knowledges such as those related to a method of conflict resolution for the inference, those related to reliability of knowledge and to a person who had knowledge, and the like. According to the present invention, meta-knowledges of the following kinds are stored in the meta-knowledge memory 5 based upon the idea that they are particularly helpful for acquiring knowledge.

(1) Information related to a list of necessary knowledge.
(2) Information for finding out knowledge that is lacking.
(3) Information related to structure of proper knowledge.
(4) Information related to constraint for satisfying proper knowledge.
(5) Information related to constraint for satisfying knowledge in a proper knowledge base.

The knowledge memory 6 has a function to store knowledge that is being acquired. The knowledge input prompting unit 17 has a function to make reference to meta-knowledge in the meta-knowledge memory 5 and to knowledge in the knowledge memory, and a function to request the user to input knowledge that is deficient.

The input knowledge checking unit 18 has a function to make reference to meta-knowledge in the meta-knowledge memory 5 and knowledge in the knowledge memory 6, and a function to evaluate the consistency of the knowledge acquired.

FIG. 4 illustrates an example of knowledge in the knowledge memory 6 of when the knowledge is to be expressed according to a production rule, and FIG. 5 illustrates an example of meta-knowledge in the meta-knowledge memory 5. The metaknowledge includes an unalterable portion and an alterable portion being preceded by a "?" in FIG. 5.

Described below is the operation for acquiring knowledge in the system of the embodiment. In the following description, knowledge is added utilizing the knowledge input prompting unit 17 and the input knowledge checking unit 18 in conjunction with a flow chart of FIG. 6.

A step 41 determines a content that is to be inputted by the user next time by making reference to a list of necessary knowledge, information for finding knowledge that is deficient, and meta-knowledge having structure of knowledge as designated at 35 in FIG. 5.

When there is an item that is requested to be inputted a step 42, the program proceeds to step 43 which produces prompt to input and receives input from the user.

If inputted data in step 44 is not empty, the program proceeds to a step 45. The program is branched to the step 41.

The step 45 checks the content inputted data by the user as a constraint for satisfying knowledge, by making reference to a frame structure designated at 35, 31 or 33 in FIG. 5, i.e., by making reference to meta-knowledge that describes slot names and values assumed by the slots.

When the inputted data does not satisfy the constraint in a step 46, the program proceeds to a step 47 which produces an explanation of adverse causes and receives again the input from the user. The program then returns to the step 45.

When an indefinite repetition is to be finished, or when omittable contents are to be omitted as designated at 36 in FIG. 5 (step 44), the program returns to the step 41.

If input by the user in the step 42 is empty, the program proceeds to a step 48 which checks the contents that can be checked at a moment when the input is interrupted utilizing the constraint of knowledge as designated at 38 in FIG. 5.

If the constraint is satisfied in a step 49, the program terminates. If the constraint is not satisfied, the program proceeds to a step 50 which receives command by which the user is allowed to correct information that was input thus far, and the program proceeds to the step 48.

FIG. 7 illustrates an interaction to the user in the case when the knowledge shown in FIG. 4 is stored in the knowledge memory 6 and the meta-knowledge shown in FIG. 5 is stored in the meta-knowledge memory 5. In FIG. 7, the underlined portions represent the user's input.

A prompt 51 guides the user now to input data in compliance with the above-mentioned structure 35 of animal recognition rule. In an input 52, the user inputs a minimum content that is required. A message 53 makes reference to the type of a slot value in the structure 31 of frame, and explains that the input data does not satisfy the constraint 32.

An input 54 shows the end of repetition in the structure 36 of repeating the rule. A message 55 explains the result of evaluation of the constraint 38 of the animal recognition rule.

Figure 6:
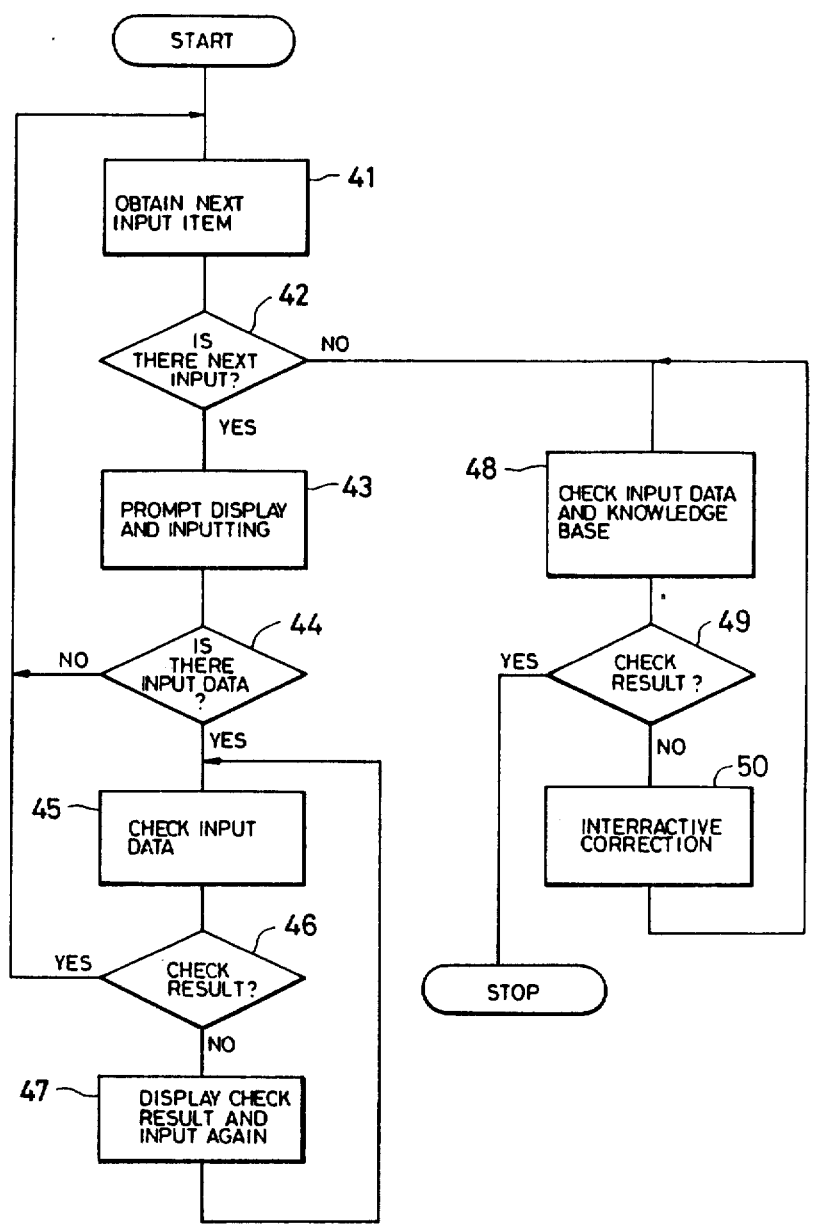
FIG. 6 is a flow chart illustrating the operation for acquiring knowledge in the system of the invention.

When the knowledge is to be corrected or deleted, a loop consisting of the steps 50, 48 and 49 of FIG. 6 is executed. If the user wishes to be prompted in the step 50, the program proceeds to the step 41.

According to this embodiment as described above, the user is required simply to input information for the queried items only to thereby prepare and build a knowledge base. Further, the the user's input is checked from various aspects, making it possible to detect error at an early time.

Described below is how to adapt the knowledge information processing system to the office work. When expertise can be collected as a manual, this system works to efficiently collect and utilize such knowledge. Namely, this is one of the forms for acquiring knowledge.

Most of the office work is based upon documents, and the expert's work in the office is almost all concerned with documents. The expert may have know-how that is difficult to be written on the document. However, there are many works that can be executed according to written rules.

In this sense, the above embodiment had not been limited to the application of office work only. Therefore, attention had not been given to a relation between the document and the knowledge in the office, and difficulty was involved in acquiring knowledge of the expert system to aid the office work.

According to this embodiment, provision is made of means for defining information, means for storing information, and means for utilizing information, by giving attention to the fact that there exists in the office a format that defines data structure for executing the manual that describes how to proceed the work and for executing the work, and that there further exists a sheet according to the format for every transaction of work. According to this embodiment, furthermore, knowledge of office is related to a document, and the format and the manual are separately defined.

Moreover, reference is made to meta-information related to the format and the manual, in order to reduce the chance where error may be involved in defining the format and the manual.

Figure 2:
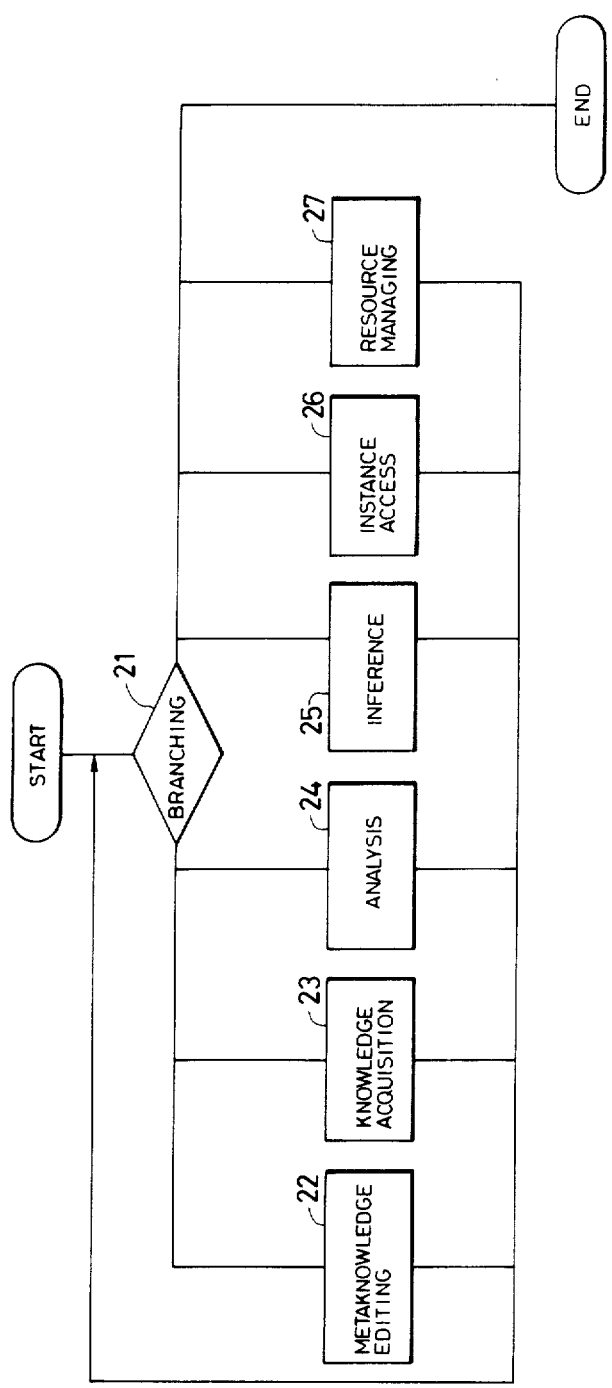
FIG. 2 is a flow chart illustrating the operation of the system.

In the embodiment that will be described below, designations and functions of the portions of FIGS. 1 and 2 are as written in FIGS. 8 and 9.

Figure 8:
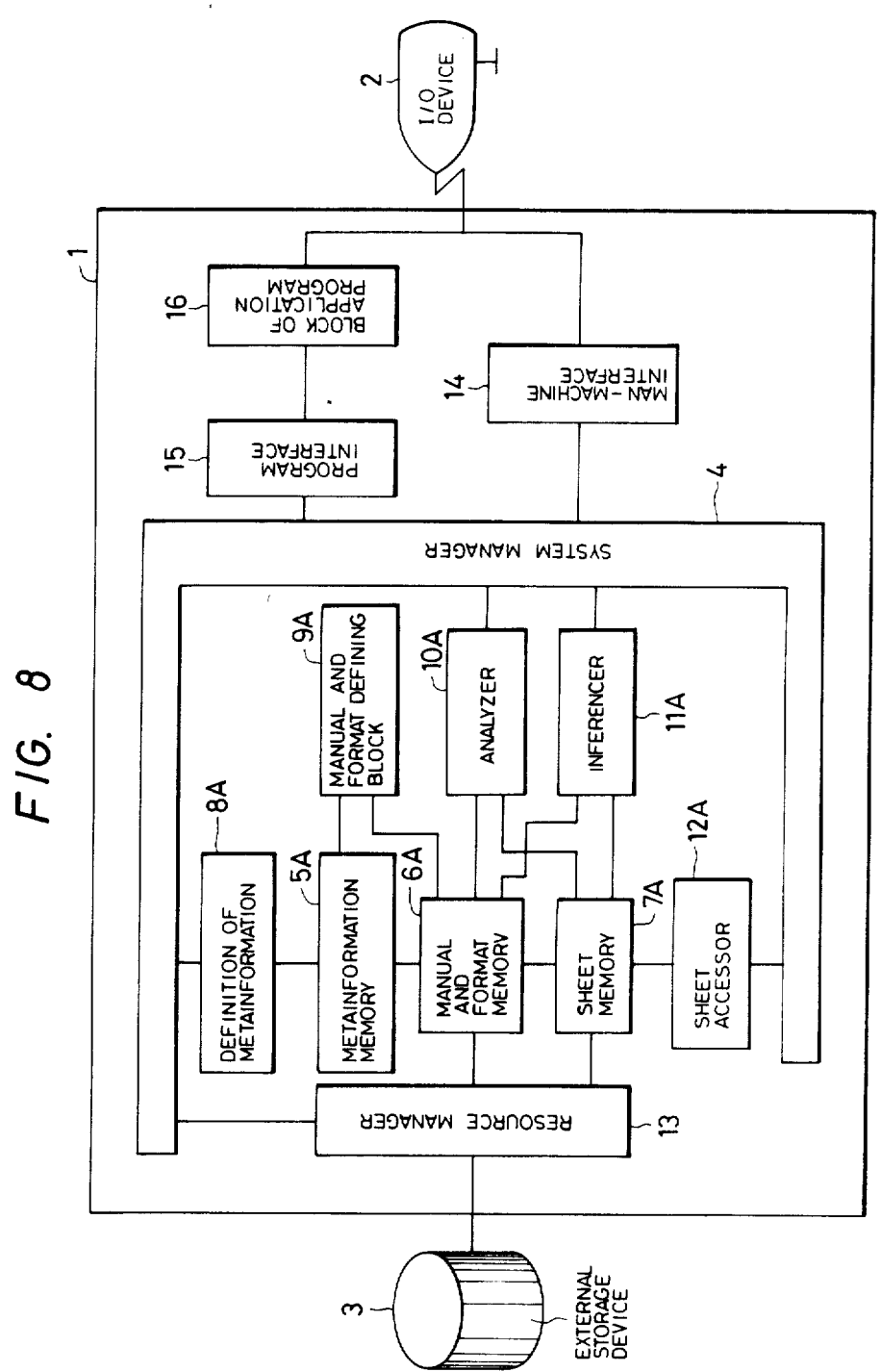
FIG. 8 is a diagram showing the structure of a system according to another embodiment of the present invention.

That is, in FIG. 8, reference numerals 1 to 4 and 13 to 16 denote the same constituent elements as those shown in FIG. 1, reference numeral 5A denotes a meta-information memory, 6A denotes a manual and format memory, 7A denotes a sheet memory, 8A denotes a meta-information defining block, 9A denotes a manual and format defining block, 10A denotes an analyzer, 11A denotes an inferencer, and 12A denotes a sheet accessor.

The operation of the system will now be described in conjunction with FIG. 9. Instructions ordered from the man-machine interface 14 and the program interface 15 are branched by the system manager 4 into six different processings in the same manner as described earlier.

The meta-information defining block 8A executes meta-information editing 22A, and meta-information inputted by the user is stored in the meta-information memory 5A. The meta-information is related to the manual and format that will be described later, and include, for example, "three manuals having designations a, b and c".

By making reference to information in the meta-information memory 5A, manual and format information editing 23A requests the user to input manual and format. Information input by the user is stored in the manual and format memory 6A. The manual includes rules such as "if the column y of the sheet of a format x is z, then replace the column t of the sheet of a format s by u" and definitions such as "a man who is responsible for p is a section chief or a department manager". The format is information which defines the structure of a slip or book that is usually used in an office. This processing is executed by the manual and format defining block 9A.

Information analysis 24A makes reference to information in the manual and format memory 6A and in the sheet memory 7A, and hands a correlation therebetween over to the user. For example, rules that satisfy the conditional portions of rule information in the manual depending upon the value of a sheet at a given moment, is handed over to the user. This processing is executed by the analyzer 10A.

Inference 25A is executed by the inferencer 11A. This processing is to carry out inference by making reference to information in the manual and format memory 6A and in the sheet memory, and information in the sheet memory 7A is updated.

Sheet filling 26A is executed by the sheet accessor 12A. This processing is to update information in the sheet memory 7A.

Resource managing 27A is executed by the resource manager 13 to transfer and reproduce information treated in the system between the main memory and the external storage device 3.

As described above, this embodiment clearly separates the manual, the format and the sheet to be updated, that will be referred to in linking knowledge of an office to a document and in processing the work. Further, means is provided to prevent error from entering into the information. Therefore, knowledge can be efficiently acquired.

According to the present invention which deals with an information processing system having a central processing unit, an external storage device and an input-/output device as described above, the central processing unit is provided with a memory for storing meta-knowledge and a unit for utilizing metaknowledge stored in the memory, so that, in newly acquiring knowledge, the metaknowledge stored in the memory can be utilized by the utilizing unit. Therefore, there is realized a knowledge information processing system that efficiently acquires knowledge and debugs said knowledge thereof.

We claim:

1. In an information processing system which has processing means, memory means, and input/output means, a knowledge information processing system comprising:

memory means for storing meta-knowledge including a knowledge structure information of an alterable part and unalterable part necessary for acquiring knowledge; and a processing means for acquiring new knowledge utilizing said meta-knowledge stored in said memory means.

2. The knowledge information processing system according to claim 1, further comprising:

an acquired knowledge storing means for storing knowledge to be acquired, and wherein said processing means further includes means for requesting an input of a specific knowledge in accordance with said stored meta-knowledge and said stored knowledge.

3. The knowledge information processing system according to claim 1, further comprising:

an acquired knowledge storing means for storing knowledge to be acquired, and a knowledge inputting means, and wherein said processing means further includes means for evaluating correctness of knowledge inputted by said inputting means by reference to said meta-knowledge stored and said knowledge stored.

4. In an information processing system which has processing means, memory means, and input/output means, a knowledge information processing system comprising:

knowledge defining means for defining knowledge information to specify data structure of a result of an inference on the basis of inputted information by interaction with said input/output means;

rule defining means for defining rules to renew a result of an inference; and updating means for forming said result of an inference from knowledge defined from the knowledge defining means to specify a data structure, and rules defined by said rule defining means to update said result of an inference.

5. A knowledge information processing system according to claim 4, wherein the updating means includes means for generating updates in an event-driven manner.

6. In an information processing system which has processing means, memory means, and input/output means, a knowledge information processing system comprising:

memory means for storing meta-knowledge for acquisition of knowledge defined by a knowledge structure with an unalterable portion and an alterable portion; and processing means for acquiring new knowledge in accordance with meta-knowledge stored in said memory means.

7. The knowledge information processing system according to claim 6, wherein said meta-knowledge is further defined to include information of procedures for acquiring knowledge to alter said alterable part.

8. In an information processing system which has processing means, memory means and input/output means, a knowledge information processing system comprising:

means for defining a manual for a format of a slip and book and for a sheet adapted to said format used in an office environment, on the basis of information input by interaction of said input/output means;

means for forming said sheet from said format to renew a value of said sheet; and means for renewing said sheet in an event-driven manner in accordance with reference to said manual.

9. The knowledge information processing system according to claim 8 further comprising:

means for defining meta-information of said format and said manual;

means for updating said sheet in an event-driven manner by making reference to said manual; and wherein the processing unit includes means for defining said format and said manual references meta-information in said meta-information defining means.

10. A knowledge information processing method in an information processing system which has processing means, memory means and input/output means comprising:

a step for storing meta-knowledge having an alterable portion and unalterable portion in said memory means; an a processing step for acquiring new knowledge utilizing said meta-knowledge stored in said memory means.

11. A knowledge information processing method in an information processing system which has processing means, memory means and input/output means comprising the steps of:

defining knowledge information to specify data structure of a result of inference on the basis of inputted information by interaction of said input/output means;

defining rules for renewing result of inference; and forming said result of inference from said defined knowledge information to specify data structure and said rules to update said result of inference.

12. The knowledge information processing method of claim 11, further comprising the steps of:

storing knowledge to be acquired; and requesting an input of a specific knowledge by referring to said meta-knowledge stored and said knowledge stored.

13. The knowledge information processing method according to claim 11, further comprising:

a knowledge storing step for storing knowledge to be acquired; and a knowledge inputting step, and said processing step further having a step for evaluating correctness of a knowledge inputted by said inputting step by reference to stored meta-knowledge and stored knowledge.

14. A knowledge information processing method in an information processing system which as processing means, memory means, and input/output means comprising the steps of:

storing meta-knowledge for acquisition of knowledge having knowledge structure information of a part which should not be altered after defined and of an alterable part; and acquiring new knowledge utilizing stored meta-knowledge.

15. The knowledge information processing method of claim 14 further comprising the step of acquiring knowledge to alter said alterable part of said meta-knowledge.

* * * * *